(12) United States Patent
Fellenstein et al.

(10) Patent No.: US 7,743,142 B2
(45) Date of Patent: Jun. 22, 2010

(54) VERIFYING RESOURCE FUNCTIONALITY BEFORE USE BY A GRID JOB SUBMITTED TO A GRID ENVIRONMENT

(75) Inventors: Craig William Fellenstein, Brookfield, CT (US); Rick Allen Hamilton, II, Charlottesville, VA (US); Joshy Joseph, Poughkeepsie, NY (US); James W Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/359,216

(22) Filed: Jan. 23, 2009

(65) Prior Publication Data

US 2009/0132703 A1 May 21, 2009

Related U.S. Application Data (63) Continuation of application No. 11/031,427, filed on Jan. 6, 2005, now Pat. No. 7,502,850.

(51) Int. Cl.
*G06F 15/173* (2006.01)
(52) U.S. Cl. .................. 709/224; 709/205; 709/218; 709/220; 709/249; 709/251
(58) Field of Classification Search .......... 709/205, 709/218, 220, 224, 249, 251
See application file for complete search history.

(56) References Cited

U.S. PATENT DOCUMENTS

| | | | |
|---|---|---|---|
| 5,640,569 A | 6/1997 | Miller et al. | |
| 5,905,975 A | 5/1999 | Ausubel | |
| 6,003,075 A * | 12/1999 | Arendt et al. | 709/221 |
| 6,021,398 A | 2/2000 | Ausubel | |
| 6,023,612 A | 2/2000 | Harris et al. | |
| 6,167,445 A | 12/2000 | Gai et al. | |
| 6,310,889 B1 | 10/2001 | Parsons et al. | |
| 6,430,711 B1 | 8/2002 | Sekizawa | |
| 6,480,955 B1 * | 11/2002 | DeKoning et al. | 713/100 |
| 6,552,813 B2 | 4/2003 | Yacoub | |
| 6,647,373 B1 | 11/2003 | Carlton-Foss | |
| 6,654,807 B2 | 11/2003 | Farber et al. | |

(Continued)

OTHER PUBLICATIONS

Office Action, U.S. Appl. No. 12/211,243, filed Sep. 16, 2008, Di Luoffo et al, Mailed Aug. 12, 2009, pp. 1-18.

(Continued)

*Primary Examiner*—Michael Won
(74) *Attorney, Agent, or Firm*—William H. Steinberg; Amy J. Pattillo (57) ABSTRACT

A method, system, and program for verifying resource functionality before use by a grid job submitted to a grid environment are provided. When a new resource is allocated to a particular execution environment within a grid environment managed by a grid management system, then a grid verification service automatically selects and runs at least one functionality test on the new resource as controlled by the grid management system. Responsive to a result of the functionality test, the grid verification system verifies whether the result meets an expected result before enabling routing of the grid job to the new resource, such that the functionality of the new resource is automatically verified before access to the new resource is allowed to maintain quality of service in processing grid jobs.

10 Claims, 5 Drawing Sheets

U.S. PATENT DOCUMENTS

| | | | |
|---|---|---|---|
| 6,717,694 B1 | 4/2004 | Fukunaga et al. | |
| 6,816,905 B1 | 11/2004 | Sheets et al. | |
| 6,963,285 B2 | 11/2005 | Fischer et al. | |
| 7,050,184 B1 | 5/2006 | Miyamoto | |
| 7,055,052 B2 | 5/2006 | Chalasani et al. | |
| 7,080,077 B2 | 7/2006 | Ramamurthy et al. | |
| 7,093,259 B2* | 8/2006 | Pulsipher et al. | 718/106 |
| 7,096,248 B2 | 8/2006 | Masters et al. | |
| 7,124,062 B2* | 10/2006 | Gebhart | 702/186 |
| 7,171,654 B2 | 1/2007 | Werme et al. | |
| 7,181,743 B2 | 2/2007 | Werme et al. | |
| 7,243,147 B2* | 7/2007 | Hodges et al. | 709/224 |
| 7,272,732 B2 | 9/2007 | Farkas et al. | |
| 7,293,092 B2* | 11/2007 | Sukegawa | 709/226 |
| 7,340,654 B2* | 3/2008 | Bigagli et al. | 714/47 |
| 7,433,931 B2 | 10/2008 | Richoux | |
| 7,451,106 B1 | 11/2008 | Gindlesperger | |
| 7,472,112 B2 | 12/2008 | Pfeiger et al. | |
| 7,533,168 B1 | 5/2009 | Pabla et al. | |
| 7,552,437 B2 | 6/2009 | Di Luoffo et al. | |
| 7,562,143 B2 | 7/2009 | Fellenstein et al. | |
| 7,584,274 B2 | 9/2009 | Bond et al. | |
| 2002/0116488 A1* | 8/2002 | Subramanian et al. | 709/224 |
| 2003/0041010 A1* | 2/2003 | Yonao-Cowan | 705/37 |
| 2003/0088671 A1* | 5/2003 | Klinker et al. | 709/225 |
| 2003/0195813 A1 | 10/2003 | Pallister et al. | |
| 2004/0095237 A1* | 5/2004 | Chen et al. | 340/506 |
| 2004/0098606 A1* | 5/2004 | Tan et al. | 713/200 |
| 2004/0145775 A1* | 7/2004 | Kubler et al. | 358/1.15 |
| 2004/0213220 A1* | 10/2004 | Davis | 370/389 |
| 2004/0215590 A1* | 10/2004 | Kroening | 707/1 |
| 2004/0225711 A1* | 11/2004 | Burnett et al. | 709/201 |
| 2005/0021349 A1* | 1/2005 | Cheliotis et al. | 705/1 |
| 2005/0021742 A1* | 1/2005 | Yemini et al. | 709/224 |
| 2005/0027691 A1* | 2/2005 | Brin et al. | 707/3 |
| 2005/0044228 A1* | 2/2005 | Birkestrand et al. | 709/226 |
| 2005/0065994 A1* | 3/2005 | Creamer et al. | 709/202 |
| 2005/0132041 A1* | 6/2005 | Kundu | 709/224 |
| 2005/0138162 A1* | 6/2005 | Byrnes | 709/223 |
| 2005/0138175 A1* | 6/2005 | Kumar et al. | 709/226 |
| 2005/0182838 A1* | 8/2005 | Sheets et al. | 709/226 |
| 2005/0187797 A1* | 8/2005 | Johnson | 705/3 |
| 2005/0187977 A1 | 8/2005 | Frost | |
| 2005/0257079 A1 | 11/2005 | Arcangeli | |
| 2006/0069621 A1* | 3/2006 | Chang et al. | 705/26 |
| 2006/0075041 A1* | 4/2006 | Antonoff et al. | 709/206 |
| 2006/0075042 A1 | 4/2006 | Wang et al. | |
| 2006/0288251 A1* | 12/2006 | Jackson | 714/19 |
| 2006/0294218 A1* | 12/2006 | Tanaka et al. | 709/224 |

OTHER PUBLICATIONS

Office Action, U.S. Appl. No. 11/031,542, filed Jan. 6, 2005, Dawson et al, Mailed Jul. 7, 2009, pp. 1-15.

Cao et a "Grid Flow: Workflow Management for Grid Computing", Cluster Computing and the Grid, 2003, Proceedings. CCGrid 2003. 3rd IEEE/ACM International Symposium on : Publication Date May 12-15, 2003.

Moore et al, "Managing Mixed Use Clusters with Cluster on Demand", Duke University, Nov. 2002.

Rolia, Jerry et al, "Service Centric Computing—Next Generation Internet Computing", 2002, Springer-Verlag Berlin Heidelberg, pp. 463-479.

Belloum, Adam et al, "VLAM-G: a grid-based virtual laboratory", 2002, Future Generation Computer Systems 19, Elsevier Science B.V., pp. 209-217.

Min, D. and Mutka, M., "Efficient Job Scheduling in a Mesh Multicomputer Without Discrimination Against Large Jobs", 1995, IEEE., pp. 52-59.

Office Action, U.S. Appl. No. 11/031,403, filed Jan. 6, 2005, Mailed Apr. 24, 2009.

Office Action, U.S. Appl. No. 11/031,426, filed Jan. 6, 2005, Mailed Apr. 1, 2009.

Notice of Allowance, U.S. Appl. No. 10/868,542, filed Jun. 15, 2004, Mailed Apr. 16, 2009.

Cao et al, GridFlow: Workflow management for grid computing, C&C Res. Labs, NEC Eur Ltd, Germany: This paper appears in : Cluster Computing and Grid, 2003. Proceedings. CCGrid 2003. 3rd IEEE/ACL International Symposium; Publication date: May 12-15, 2003, 8 pages.

"The DataGrid Workload Management System: Challenges and Results", Journal of Grid Computing, Springer Netherlands, ISSN 1570-7873 (Print) 1572-9814 (Online), vol. 2, No. 4, Dec. 2004, pp. 353-367.

USPTO Office Action Response in pending U.S. Appl. No. 11/031,490, filed Jan. 6, 2005, Craig William Fellenstein et al, Mailing date: May 29, 2009, 10 pages.

Office Action, U.S. Appl. No. 11/767,502, filed Jun. 23, 2007, Zhendong Bao, Mailed Jun. 25, 2009, pp. 1-14.

Weng et al, "A cost-based online scheduling algorithm for job assignment on computational grids", Springer-Verlag Berlin Heidelberg, 2003, pp. 343-351.

Andrade et al, "Our grid: An approach to easily assemble grids with equitable resource sharing", Springer-Verlag Berlin Heidelberg, 2003, pp. 61-86.

Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.

Office Action, U.S. Appl. No. 10/940,452, filed Sep. 14, 2004, Craig Fellenstein, Mailed Jun. 23, 2009, pp. 1-13.

"IBM Girds for Grids". McConnell, Chris. Enterprise System Journal, Oct. 2001, 1 page.

"Grid Computing set for big growth". Tanner, John, America's Network, vol. 107, No. 8, May 15, 2003, 6 pages.

Office Action, U.S. Appl. No. 12/125,892, filed May 22, 2008, mailed Aug. 26, 2009.

Office Action, U.S. Appl. No. 12/125,879, filed May 22, 2008, mailed Sep. 15, 2009.

Notice of Allowance, U.S. Appl. No. 12/194,989, filed Aug. 20, 2008, mailed Sep. 30, 2009.

Office Action, U.S. Appl. No. 11/031,426, filed Jan. 6, 2005, Carl Philip Gusler et al., Mailed Nov. 13, 2009, 21 Pages.

Notice of Allowance, U.S. Appl. No. 11/031,403, filed Jan. 6, 2005, Leslie Mark Ernest et al., Mailed Oct. 5, 2009, 15 Pages.

In re Fellenstein, Notice of Allowance, U.S. Appl. No. 12/125,879, filed May 22, 2008, mail date Jan. 29, 2010, 24 pages.

In re Fellenstein, Notice of Allowance, U.S. Appl. No. 11/031,490, filed Jan. 6, 2005, mail date Mar. 9, 2010, 12 pages.

In re Vincento Di Luoffo, Notice of Allowance, U.S. Appl. No. 12/211,243, filed Sep. 16, 2003, mail date Dec. 31, 2009, 18 pages.

In re Fellenstein, Final Office Action, U.S. Appl. No. 11/031,490, filed Jan. 6, 2005, mail date Dec. 28, 2009, 21 pages.

In re Fellenstein, Notice of Allowance, U.S. Appl. No. 12/364,469, filed Feb. 2, 2009, mail date Jan. 5, 2010, 27 pages.

In re Fellenstein, Supplemental Notice of Allowance, U.S. Appl. No. 12/364,469, filed Feb. 2, 2009, mail date Jan. 19, 2009, 7 pages.

In re Fellenstein, Notice of Allowance, U.S. Appl. No. 11/031,542, filed Jan. 6, 2005, mail date Dec. 8, 2009, 35 pages.

In re Fellenstein, Notice of Allowance, U.S. Appl. No. 10/940,452, filed Sep. 14, 2004, mail date Dec. 16, 2009, 28 pages.

In re Fellenstein, Office Action, U.S. Appl. No. 12/491,172, filed Jun. 24, 2009, mail date Apr. 6, 2010, 30 pages.

In re Fellenstein, Office Action, U.S. Appl. No. 12/196,287, filed Aug. 22, 2008, mail date Mar. 30, 2010, 24 pages.

In re Fellenstein, Office Action, U.S. Appl. No. 11/031,489, filed Jan. 6, 2005, mail date Apr. 5, 2010, 28 pages.

TTI Cluster Computing Services On Demand, ClusterOnDemand. com, publicly available and archived by Arhive.org on or before Dec. 8, 2004, 4 pages.

* cited by examiner

| GENERAL RESOURCE TYPE | AVAILABLE TESTS | TYPE OF RESULT |
|---|---|---|
| PROCESSORS 702 | (1) CALL OS NATIVE PROCESSOR DIAGNOSTICS<br>(2) RUN TEST JOB OF TEST EQUATION SET A | (1) LOG FILE<br><br>(2) TEST RESULTS |
| MEMORY 704 | (1) CALL OS NATIVE MEMORY DIAGNOSTICS<br>(2) RUN TEST JOB OF BIT CHECK TEST<br>(3) RUN TEST JOB OF FULL PATTERN READS/WRITE TEST | (1) LOG FILE<br>(2) TEST RESULTS<br>(3) TEST RESULTS |
| ADAPTERS (BY CLASS) 706 | (A) CALL ON-BOARD LOOP BACK TEST<br>(B) RUN CONNECTIVITY TEST | (A) LOG FILE<br>(B) PING |
| DEVICE CONNECTORS (BY CLASS) 708 | (A) CALL ON-BOARD LOOP BACK TEST<br>(B) RUN TEST JOB OF A TEST ACCESS WITH A WRITE, READ, AND DELETE TEST | (A) LOG FILE<br><br>(B) TEST RESULTS |
| STORAGE SUBSYSTEMS (BY CLASS) 710 | (1) RUN TEST JOB OF A TEST ACCESS WITH A WRITE, READ, AND DELETE<br>- REMOVABLE MEDIA - TEST FOR ENTIRE SUBSYSTEM<br>- NON-REMOVABLE MEDIA - TEST INDIVIDUAL SYSTEMS | (1) TEST RESULTS |
| OPERATING SYSTEM SOFTWARE (BY TYPE) 712 | (1) CALL OPERATING SYSTEM TOOLS FOR (A) PARAMETER TESTING (B) READINESS TESTING | (1) COMMAND RESULTS + LOG FILE |
| APPLICATION SOFTWARE (BY CLASS) 714 | (1) CALL SELF-VERIFICATION ROUTINE FOR SOFTWARE<br>(2) RUN FUNCTIONAL TEST JOB FOR CLASS OF APPLICATION SOFTWARE | (1) LOG FILE<br><br>(2) TEST RESULTS |

VERIFYING RESOURCE FUNCTIONALITY BEFORE USE BY A GRID JOB SUBMITTED TO A GRID ENVIRONMENT

CROSS-REFERENCE TO RELATED APPLICATIONS

This application is a continuation of commonly assigned U.S. patent application Ser. No. 11/031,427, filed Jan. 6, 2005, which is hereby incorporated herein by reference.

The present application is related to the following co-pending applications:
(1) U.S. patent application Ser. No. 11/031,490;
(2) U.S. patent application Ser. No. 11/031,541; and
(3) U.S. patent application Ser. No. 11/031,543.

BACKGROUND OF THE INVENTION

1. Technical Field

The present invention relates in general to improved grid computing and, in particular, to automated verification of resource functionality for resources within a grid environment. Still more particularly, the present invention relates to verifying grid resource functionality before enabling routing of a grid job submitted to the grid environment to the resources, such that the functionality of resources handling grid jobs is ensured.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

While clusters or other groups of servers can be grouped within a grid environment, Grid technologies do not solve all the problems associated with ensuring quality of service and performance where groups of resources are managed by different management systems with different standards are handling grid jobs. In particular, an attribute and benefit of grid technology is that resources are moved around into different virtual organizations, also referred to as execution environments, to optimize available resources. Clients submitting jobs to any computing system expect that the resources provided to handle a grid job are functional. A problem in the grid environment, however, is that with each resource reallocation to a new execution environment, however, the functionality of the resource is no longer verified. For example, when a network adapter is allocated in a new execution environment, connectivity with the network adapter is no longer verified unless a system administrator runs a test to ensure the connectivity of the network adapter. As the number of resources and resource reallocations increases in a grid environment, using a system administrator to manually select and run tests for each resource will degrade performance.

In view of the foregoing, there is a need for a computer-implemented method, system, and program for detecting new resources in an execution environment, testing each resource for functionality, and verifying the functionality of a resource, before routing a grid job to that resource, to assure quality of service of each job submitted to a grid environment.

SUMMARY OF THE INVENTION

In view of the foregoing, the present invention in general provides for improved grid computing and in particular to automated verification of resource functionality for resources within a grid environment. Still more particularly, the present invention relates to verifying resources within an execution environment before enabling routing of a grid job submitted to the grid environment to the resources within the execution environment, such that the functionality of resources handling grid jobs is ensured.

In one embodiment, when a new resource is allocated to a particular execution environment within a grid environment managed by a grid management system, then a grid verification service automatically selects and runs at least one functionality test on the new resource as controlled by the grid management system. Responsive to a result of the functionality test, the grid verification system verifies whether the result meets an expected result before enabling routing of the grid job to the new resource, such that the functionality of the new resource is automatically verified before access to the new resource is allowed to maintain quality of service in processing grid jobs.

The grid management system may detect that a new resource is allocated to a particular execution environment when the new resource is added to an existing execution environment of resources previously tested for functionality. In addition, grid management system may detect that a new resource is allocated to a particular execution environment that is newly built, and thus all the resources in the execution environment need to be tested for functionality. Further, the grid management system may detect that a new resource is allocated to a particular execution environment to replace a defective resource in the execution environment.

In running at least one functionality test on the new resource, tests may be selected according to type of resource and further specified according to class of resource or resource brand. One type of functionality test directs a test job to the new resource from the grid management system and the test result for the test job is collected. Another type of functionality test calls a diagnostic tool enabled to locally test the new resource and a log file indicating the test results is received.

If an error condition is detected in the result, the grid verification service may attempt to resolve the error. If the error is resolved, then the grid verification service verifies the functionality of the new resource. Alternatively, if the error is not resolved, then the grid verification service identifies the error and the grid management system may attempt to replace the resource.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
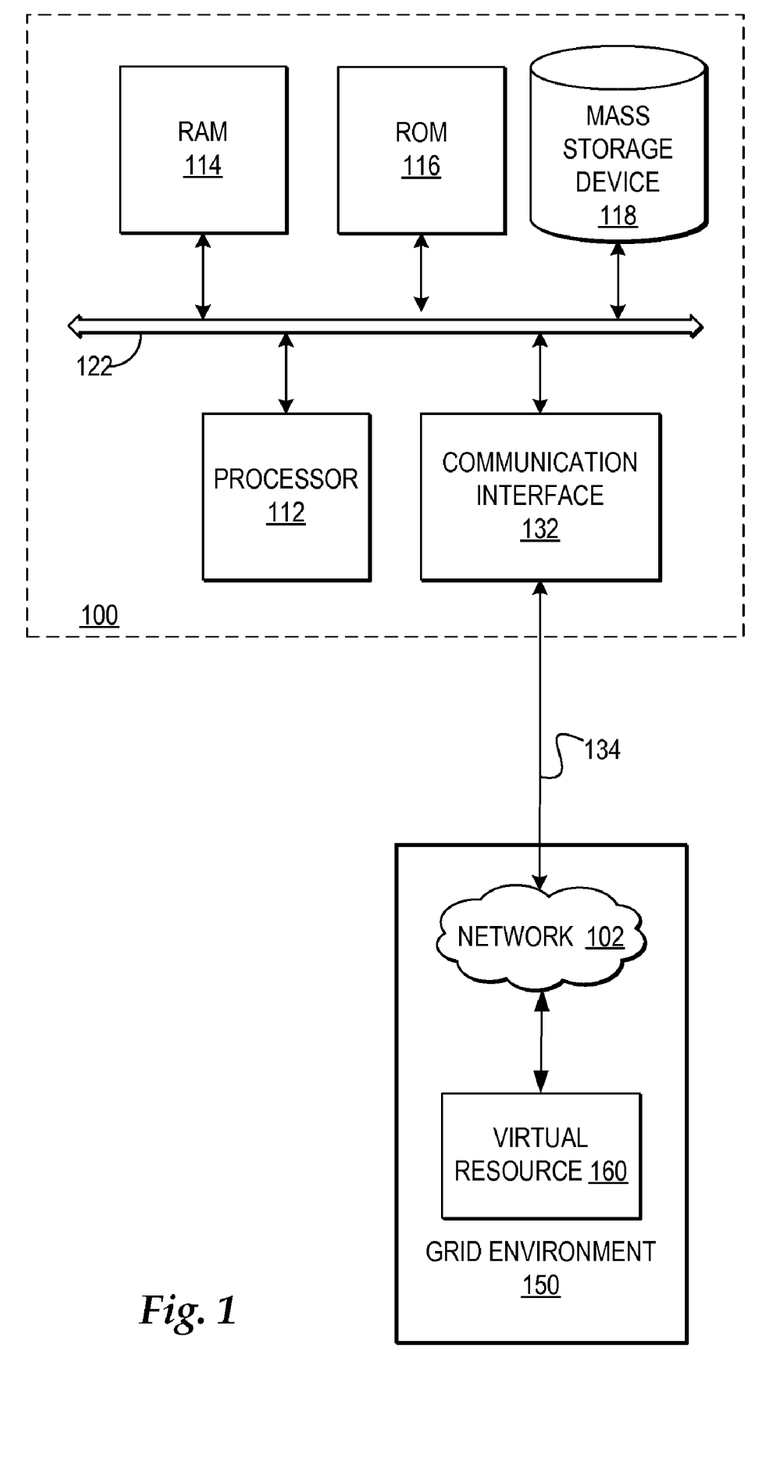
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 8, 9, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
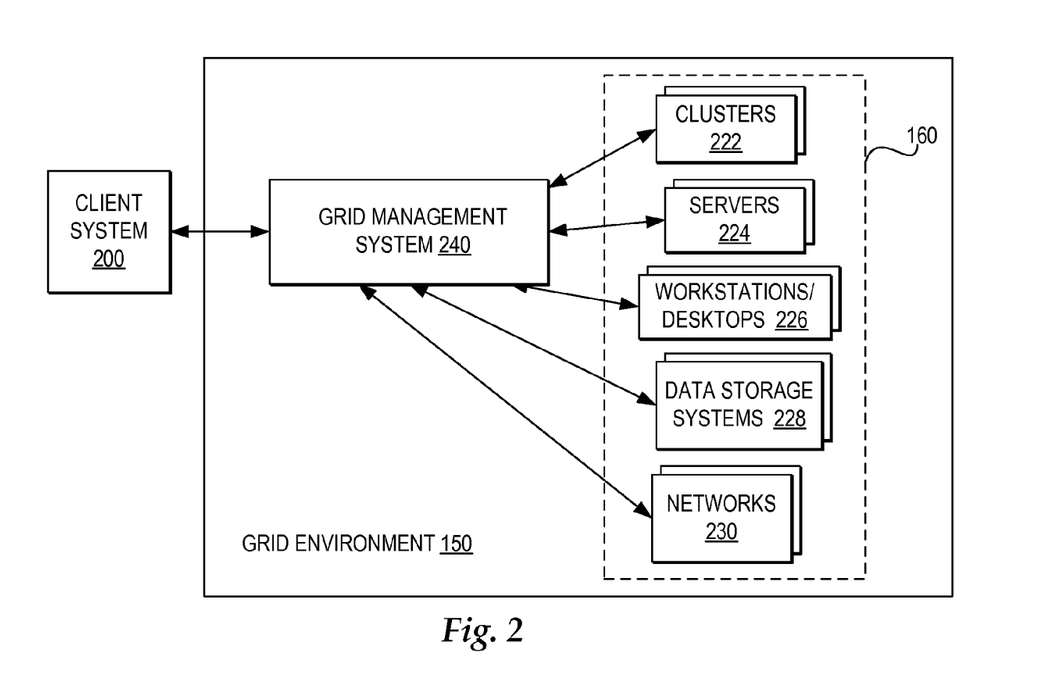
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems. In addition, it will be understood that a grid vendor may provide grid environment 150, where the grid vendor may calculate a cost for use of resources within grid environment 150 based on the amount of time required for a grid job to execute or the actual amount of resources used, for example.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another. It will be understood that mechanisms for discovery of grid resources within virtual resource 160 are not depicted herein, however, client system 200 may discover the resources within virtual resource 160 as advertised from local and global directories available within grid environment 150.

In the example, client system 200 interfaces with grid management system 240. Client system 200 may represent any computing system sending requests to grid management system 240. In particular, client system 200 may send virtual job requests and jobs to grid management system 240 and grid management system 240 may respond with a grid offer and controls processing of grid jobs. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that client system 200 may physically encompass the systems depicted within virtual resources 160. Further, the systems in virtual resource 160 may be allocated among resource nodes and execution environments, where a resource node is a grouping of resources enabled to perform a particular grid function and an execution environment is a grouping of resources and resource nodes enabled to handle a particular grid job.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

In one example, as will be further described in detail, grid management system 240 may include a grid service that allocates resources and resource nodes to an execution environment suitable for an incoming grid job and manages resources and resource nodes within the execution environment to ensure the performance of the grid job. In addition, grid management system may include a grid service that first tests and verifies grid resources allocated to an execution environment before a grid job is routed to the allocated resources. In the event that an error is detected, the grid service will attempt to resolve the error or replace the resource.

Figure 3:
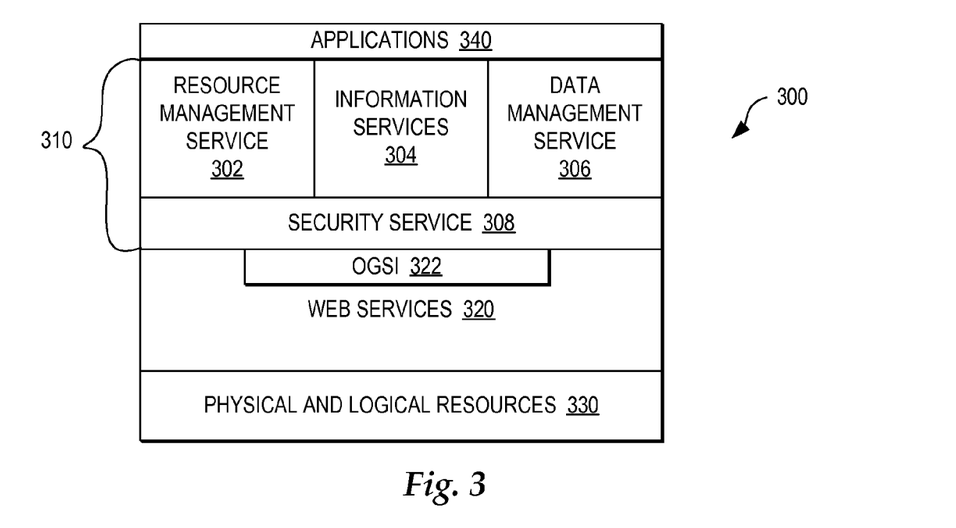
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services which may be incorporated into grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
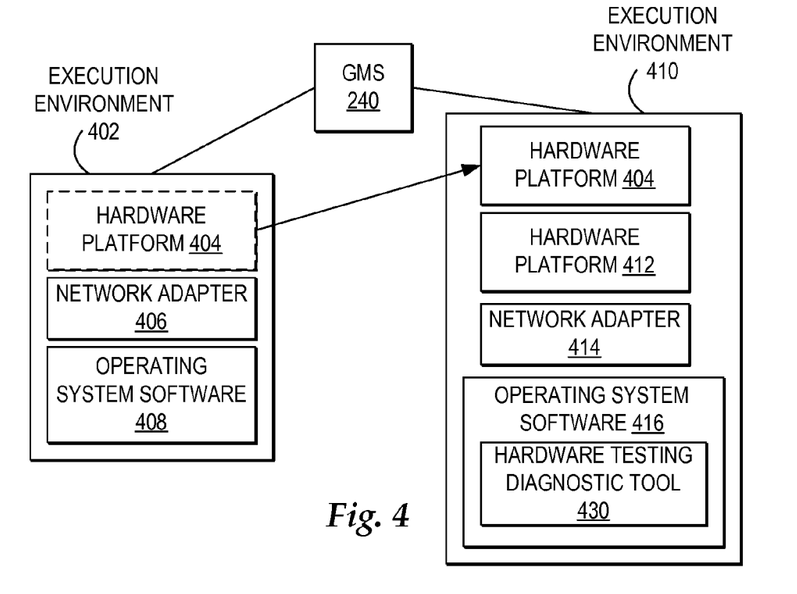
FIG. 4 is a block diagram depicting an instance of a grid management system managing multiple execution environments within a grid environment in accordance with the method, system, and program of the present invention.

With reference now to FIG. 4, there is depicted a block diagram of an instance of a grid management system managing multiple execution environments within a grid environment in accordance with the method, system, and program of the present invention. As depicted, grid management system (GMS) 240 manages multiple execution environments 402 and 410. In the example, each of execution environments 402 and 410 include multiple resources allocated for handling a particular grid job or batch of grid jobs. It will be understood that GMS 240 may physically include multiple instances that provide the functions of GMS 240. In addition, GMS 240 may be distributed across multiple physical systems within grid environment 150 and may incorporate multiple grid services.

According to one embodiment, GMS 240 builds execution environments of grid resources that are able to handle grid jobs and provide a particular level of quality of service for grid jobs. GMS 240 may build an execution environment of all new resources, where a new resource is one that has not previously been included in a particular execution environment. In addition, GMS 240 may build an execution environment and then add new resources as additional resources are required or as faulty resources requirement replacement. Additionally, GMS 240 may reuse an execution environment for multiple grid jobs from multiple disparate clients, as long as the execution environment meets the specifications agreed to for the performance and other requirements of each grid job.

Within an execution environment, each resource may be controlled by a local management system that interfaces with GMS 240 via the grid infrastructure. In addition, within an execution environment, groups of resources may be controlled by a hardware level management system, such as a cluster based management system that manages the load across multiple server systems grouped in a cluster. It will be understood that additional configurations of resources, in additional to the configurations depicted for purposes of example, may implement the present invention.

In one example, execution environment 402 includes multiple grid resources, which when viewed individually, include a hardware platform 404, a network adapter 406, and operating system software 408. These individual resources may be distributed among multiple physically disparate locations. Further, these individual resources may be part of clusters of server systems managed by cluster management tools.

GMS 240 may also manage an execution environment 410. Execution environment 410 includes hardware platform 412, network adapter 414, and operating system software 416. In addition, GMS 240 moves hardware platform 404 from execution environment 402 to execution environment 410.

To illustrate an advantage of the invention, when GMS 240 allocates hardware platform 404 to execution environment 410, hardware platform 404 is considered a new resource which needs to be verified for functionality before allowing any grid jobs routed to execution environment 410 to execute on hardware platform 404. In one example, GMS 240 calls a hardware testing diagnostic tool 430 of operating system software 416 to request that hardware testing diagnostic tool 430 perform diagnostic testing of the functionality of hardware platform 404. Additionally, an operating system resource executing on hardware platform 404 may be called to perform the diagnostic testing. Hardware testing diagnostic tool 430 may return a log file indicating any errors found during the testing. In another example, GMS 240 may direct test equations or test operations to hardware platform 404 and receive test results which can be compared with expected results to determine if there are any functionality errors. If a functionality error is detected, then GMS 240 may remove the new resource and attempt to replace the resource within execution environment 410.

In the example, hardware testing diagnostic tool 430 is depicted as an example of a local or native diagnostic tool that can be called to perform functionality testing at the resource level, rather than from a test job performed by GMS 240. It will be understood that each type of resource may include a local, native, or on-board diagnostic tool or commands that can be called to perform functionality testing at the resource level. In addition, it will be understood that operating systems or application software may include diagnostic tools or command that can be called to perform functionality testing of other resources at the resource level.

Figure 5:
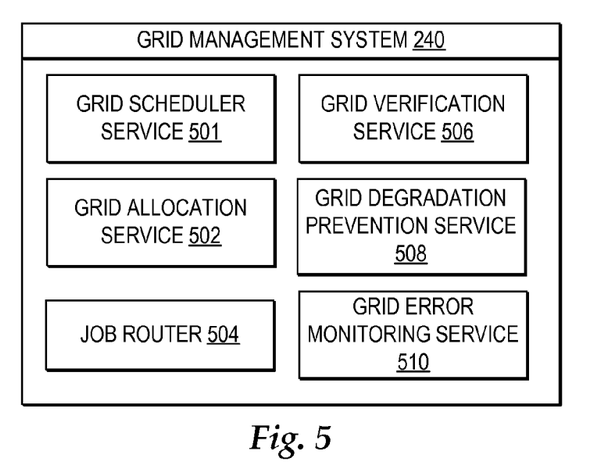
FIG. 5 is a block diagram depicting a block diagram of a grid management system for managing a grid environment in accordance with the method, system, and program of the present invention.

Referring now to FIG. 5, there is depicted a block diagram of a grid management system for managing a grid environment in accordance with the method, system, and program of the present invention. In the example, GMS 240 includes multiple grid modules that provide grid services and store data for access across grid environment 150. It is important to note that the grid modules described in GMS 240 may be distributed among multiple grid managers within grid environment 150 and may interact with resource level management tools.

As depicted, GMS 240 includes a grid scheduler 501 for detecting incoming jobs and scheduling execution of incoming jobs within grid environment 150. In particular, when grid scheduler 501 detects an incoming grid job, grid scheduler 501 passes the incoming grid job to a grid allocation service 502.

Grid allocation service 502 controls the allocation of resources within execution environments. Grid allocation service 502 may maintain available execution environments, may move resources among execution environments, and may build new execution environments. In one embodiment, grid allocation service 502 may build resource nodes of resources required to support a type of job and then move entire resource nodes among execution environments. For example, grid allocation service 502 may build a resource node with the hardware platform, operating system resources, network connector resources, storage subsystems, and application software required to support database based jobs. In addition, grid allocation service 502 may communicate with grid management systems for other grid environments to control access of additional resources from external grid environments.

When grid allocation service 502 allocates a new resource within an execution environment, grid allocation service 502 may call grid verification service 506 before enabling job router 504 to route a grid job to the new resource. In another embodiment, grid allocation service 502 may call grid verification service 506 to test a resource at the completion of a current grid job, but prior to allocating the new resource to a new execution environment. Further, in another embodiment, grid verification service 506 may continue to test and verify a resource after a grid job begins in the execution environment, and in particular, may test a verify the resource using client provided testing criteria.

Grid verification service 506 determines what tests should be run on the new resource to verify functionality, runs the tests on the new resource, and analyzes the test results. Grid verification service 506 returns a report to grid allocation service 502 either indicating the verified functionality of the new resource or indicating the unresolved error condition within the new resource.

According to one embodiment, if grid verification service 506 detects an error in the functionality of a new resource, grid verification service 506 calls grid degradation prevention service 508 with a request for error resolution. Grid degradation prevention service 508 may attempt to resolve the error in the new resource by communicating with error resolution tools local to the new resource or by performing error resolution routines. In one example, if grid verification service 508 detects that the average utilization of a CPU is greater than 90%, then grid verification service 508 may call grid degradation prevention service 508 because CPU average CPU utilization of more than 90% is considered an error. Grid degradation prevention service 508 may then enable another CPU or activate another logical partition to prevent further deterioration of the performance.

In addition to performing tests to detect errors, grid verification service 506 may receive error indicators from grid error monitoring service 510. Grid error monitoring service 510 monitors each execution environment within grid environment 150 for conditions which may indicate errors in the environment. The errors reported by grid error monitoring service 510 may be in the form of error messages or error logs. In one example, grid error monitoring service 510 may detect and report errors in a manner similar to the grid error monitoring service described in co-pending U.S. patent application Ser. No. 11/031,541, herein incorporated by reference.

It will be understood that although the services described herein provide automated processing for a grid job, any of the grid services described as part of grid management system 240 may be performed by a system administrator through human intervention. In addition, it will be understood that grid management system 240 may include additional grid services, job queues, and storage systems for improving the efficiency of grid environment 150 overall and the efficiency of grid management system 240 in handling individual grid jobs.

Figure 6:
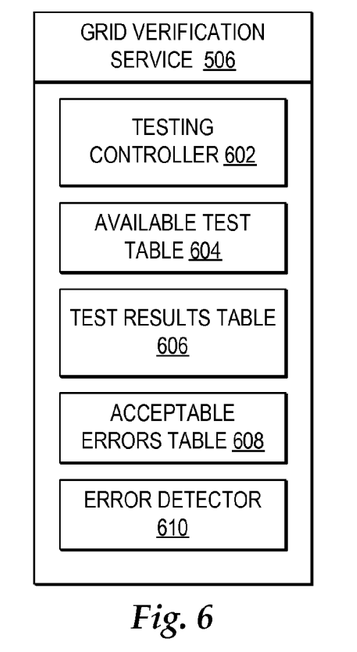
FIG. 6 is a block diagram depicting a block diagram of examples of components of a grid verification service in accordance with the method, system, and program of the present invention.

With reference now to FIG. 6, there is depicted a block diagram of examples of components of a grid verification service in accordance with the method, system, and program of the present invention. As illustrated, grid verification service 506 includes a testing controller 602. Testing controller 602 is initiated when a new resource is added to an execution environment. In addition, it will be understood that testing controller 602 may be initiated responsive to other events within the grid environment.

When testing controller 602 is initiated, testing controller 602 searches available test table 604 for applicable tests for the new resource. As will be further described with reference to FIG. 7, available test table 604 includes tests according to type of resource and further specified by class of resource. In addition, available test table 604 includes both tests that call local resource tests and test jobs to be run by testing controller 602. In addition to accessing available test table 604, testing controller 602 may query new resources to determine if the resource includes a local diagnostic tool that can be called to allow the new resource to self-verify.

Testing controller 602 collects test results in a test results table 606. Test results table 606 may include both log file data and direct testing results, organized according to new resource.

Once testing controller 602 completes testing of a new resource, error detector 610 analyzes test results table 606 for errors. In particular, error detector 610 may search log files for error conditions. In addition, error detector 610 may compare test results from tests performed by testing controller 602 with expected results and detect errors where results do not match expectations.

Then, error detector 610 accesses acceptable errors table 608 when determining how to respond to detected errors. Acceptable errors table 608 includes conditions for errors that are acceptable within a particular execution environment or within the grid environment. For example, a log file for a tested disk subsystem may indicate the reallocation of bad blocks, however, reallocation of bad blocks on a disk subsystem is designated in acceptable errors table 608 as a normal function of disk controllers.

Error detector 610 may call grid degradation prevention service 508 with a request for grid degradation prevention service 508 to attempt to resolve detected errors. In one example, grid degradation prevention service 508 is able to resolve a detected error and returns the error resolution report to error detector 610. In another example, grid degradation prevention service 508 is not able to resolve a detected error and returns an indicator that the error was not resolved. Error detector 610 then informs grid allocation service 502 whether there are any unresolved errors or whether all new resources are verified.

Figure 7:
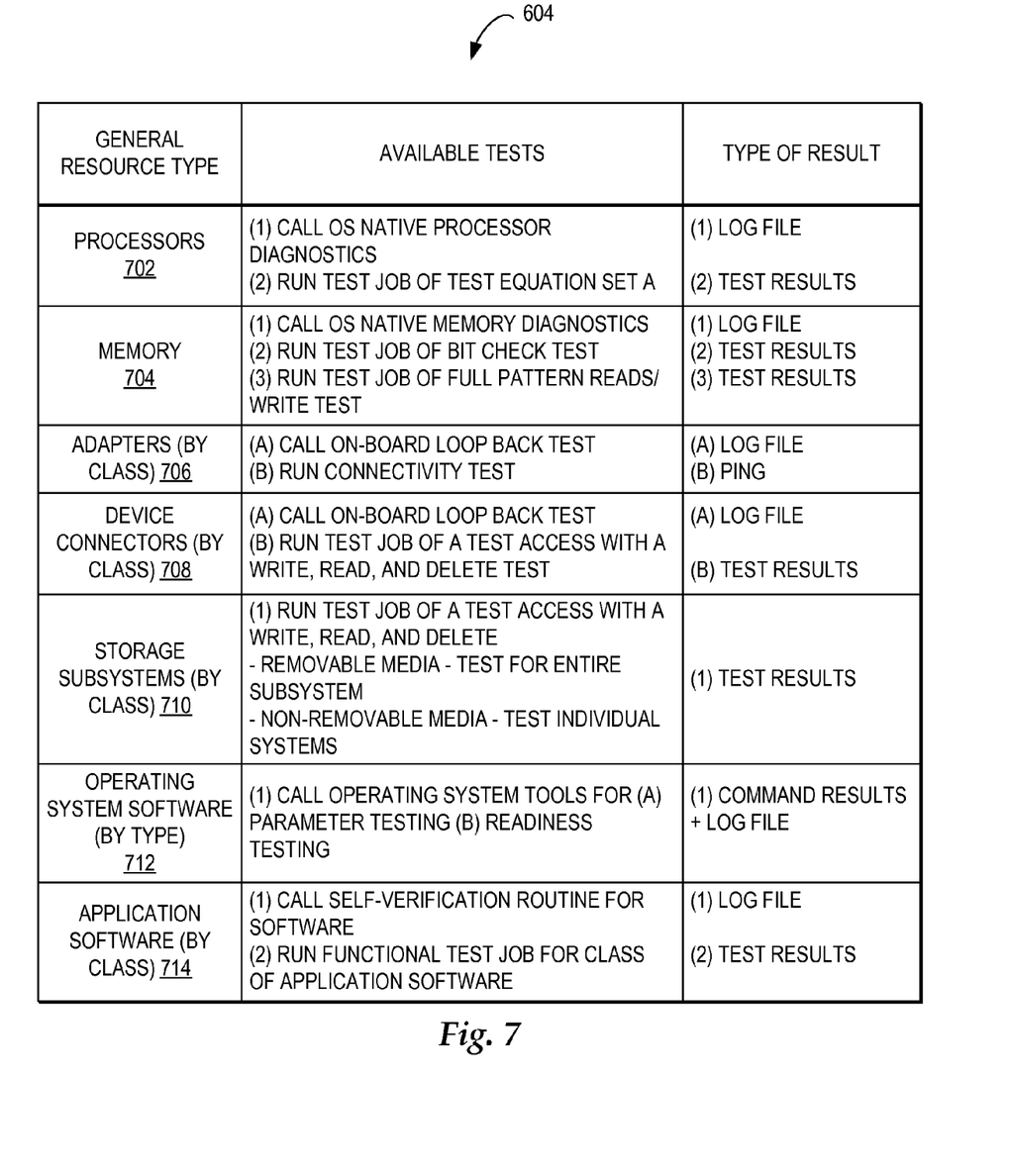
FIG. 7 is a block diagram depicting an illustrative example of entries in a test availability table in accordance with the method, system, and program of the present invention.

Referring now to FIG. 7, there is depicted an illustrative example of entries in a test availability table in accordance with the method, system, and program of the present invention. As depicted, available test table 604 includes tests specified according to the general type of resource and further specified according to a class of resources within the type. In addition, tests may be specified for each particular resource by resource name. It will be understood that the tests depicted in available test table 604 are examples of the types of tests that may be performed and called, and that the actual test sequences may be adjusted according to the precision of testing required to validate the functionality of a grid resource.

When a resource is a processor, available test table 604 designates multiple available tests and the expected result types, as illustrated at reference numeral 702. In a first example, a processor may be tested by calling the native processor diagnostics that can be invoked from an operating system; available test table 604 may include the call references for multiple types of operating system based processor diagnostics. The native processor diagnostics may return a log file. In a second example, a processor may be tested by running a test job with a set of test equations and collecting test results. Multiple sets of test equations may be available and specified according to the type of processor or processors. In either example, processors, including the bus and backplanes may be tested and the results verified.

When a resource is memory, available test table 604 designates multiple available tests and the expected result types, as illustrated at reference numeral 704. In a first example, memory may be tested by calling a local operating system based memory diagnostics tool; available test table 604 may include the command references for multiple types of operating system based memory diagnostics. In a second example, memory may be tested by running a test job of a bit check test on the memory; test results are collected for comparison against an anticipated bit pattern. In a third example, memory may be tested by running a test job of a full pattern read and write test designed to verify the memory functions; test results are collected for determination whether the read and write were properly executed. In one example, testing controller 602 may select the full pattern read and write test for faster memory resources and the bit check test for slower memory resources.

When a resource is a network adapter, available test table 604 makes multiple tests are available and sorted by the class of network adapter, as illustrated at reference numeral 706. Classes of network adapters may include, but are not limited to, SAN adapters and IP adapters. For each class of network adapter, a series of tests may be performed. First, in the series, testing controller 602 is directed to call an on-board loop back test. In particular, a network adapter may include on-board diagnostics that can be invoked by other systems through a command call. Second, in the series, testing controller 602 is directed to run a connectivity test. In one example, a connectivity test such as a ping test may be used, where a resulting "ping" is expected. It will be understood that additional tests may be specified to test the functionality of both individual network adapters and classes of network adapters.

When a resource is a device controller, such as a SCSI device controller, available test table 604 makes multiple tests available and stored by class of device controller, as illustrated at reference numeral 708. For each class of device controller, a series of tests may be performed. First, in the series, testing controller 602 is directed to call an on-board loop back test to test the local hardware. Second, in the series, testing controller 602 is directed to perform test job of a test access of the hardware. A test access, in general, includes instructions that enable verification of the adapters, paths, and read and write capabilities of a device controller. For example, if the device controller is a disk subsystem, the test access may include instructions to write a file on each disk with a predetermined data pattern, read back each file, and then delete each file.

When a resource is a storage subsystem, such as a disk or tape, available test table 604 makes multiple tests available and stored by class of storage subsystem, as illustrated at reference numeral 710. For each class of storage subsystem, a particular test access may be performed. In a case where the media is not removeable, the test may include instructions to verify each part of the storage subsystem. Alternatively, in a case where the media is removeable, the test may include instructions to verify the paths and read and write capabilities of the whole storage subsystem. Further, if a storage subsystem includes an on-board diagnostic tool, available test table 604 may include a call operation for the on-board diagnostic tool.

When a resource is operating system software, available test table 604 makes multiple tests available according to type of operating system, as illustrated at reference numeral 712. For each type of operating system, the test includes instructions to call the operating system tools for parameter testing and readiness testing. In particular, each operating system may include diagnostic tools that can be called to verify the operating system. In one example, the test may include instructions to call tools within the AIX operating system (AIX is a registered trademark of International Business Machines Corporation). In particular, with reference to the AIX operating system, a "lppchk-v" instruction can be called to test to ensure that no software components inconsistencies exist; a "oslevel-r" instruction can be called to request the operating system release level and maintenance level; a "inst-fix-ik" instruction can be called to verify that all filesets are present for the current release and maintenance level; a "lslpp-L" instruction can be called, and used with a filter that specifies which results are requested to determine the presence and state of any specific operating system file set or device driver; and a "set" instruction can be called, and used with a filter, to determine the presence and value of required environment variables. It will be understood that additional AIX operating system instructions may be called to test the parameters and readiness of the AIX operating system. In addition, it will be understood that other types of instructions may be specified to call for other operating systems.

When a resource is application software, available test table 604 makes multiple tests available according to the type of software, as illustrated at reference numeral 714. If application software includes a self-verification routine, available test table 604 may include a specific call for the self-verification routine. Alternatively, available test table 604 may include an instruction to run a functionality test job for the particular class of application of the current application. In one example, the application software resource is DB2 database software (DB2 is a registered trademark of International Business Machines Corporation), which is in the database software class. A database class functional test job would require performance of the following operations: (1) verify the correct daemons and processes are running; (2) connect to the database and verify connection to the database; (3) create a test table in the database; (4) populate test data into the table; (5) execute a query with known results against the table and verify the results; (6) delete the test table; (7) disconnect from the database; and (8) remove the database alias. It will be understood that additional operations that test and verify database software may be invoked. In addition, it will be understood that available test table 604 illustrates sample test cases with results and result types, however, those skilled in the art could extend these sample test cases to additional or more suitable platforms and applications.

Figure 8:
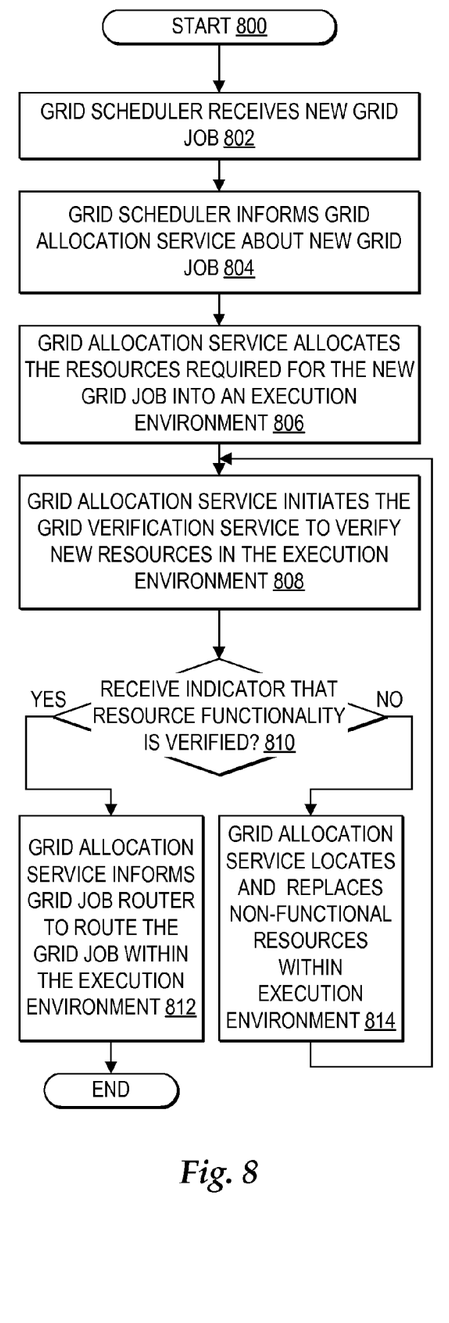
FIG. 8 is a high level logic flowchart of a process and program for controlling grid job routing to verified resources within an execution environment for the grid job in accordance with the method, system, and program of the present invention.

With reference now to FIG. 8, there is depicted is a high level logic flowchart of a process and program for controlling grid job routing to verified resources within an execution environment for the grid job in accordance with the method, system, and program of the present invention. As illustrated, the process starts at block 800 and thereafter proceeds to block 802. Block 802 depicts a grid scheduler receiving a new grid job. Next, block 804 depicts grid scheduler informing the grid allocation service about the new grid job. Thereafter, block 806 depicts the grid allocation service assembling the resources required for the new grid job into an execution environment for the new grid job. Next, block 808 depicts the grid allocation service initiating the grid verification service to verify the new resources in the execution environment, and the process passes to block 810.

Block 810 depicts a determination whether the grid allocation service receives an indicator that the resource functionality is verified. If the resource functionality is verified, then the process passes to block 812. Block 812 depicts the grid allocation service informing the grid job router to route the job to the resources or a replacement resource within the execution environment, and the process ends. Otherwise, at block 810, if resource functionality is not verified, then the process passes to block 814. Block 814 depicts the grid allocation service location replacement resources and replacing non-functional resources within the execution environment; then the process returns to block 808.

Figure 9:
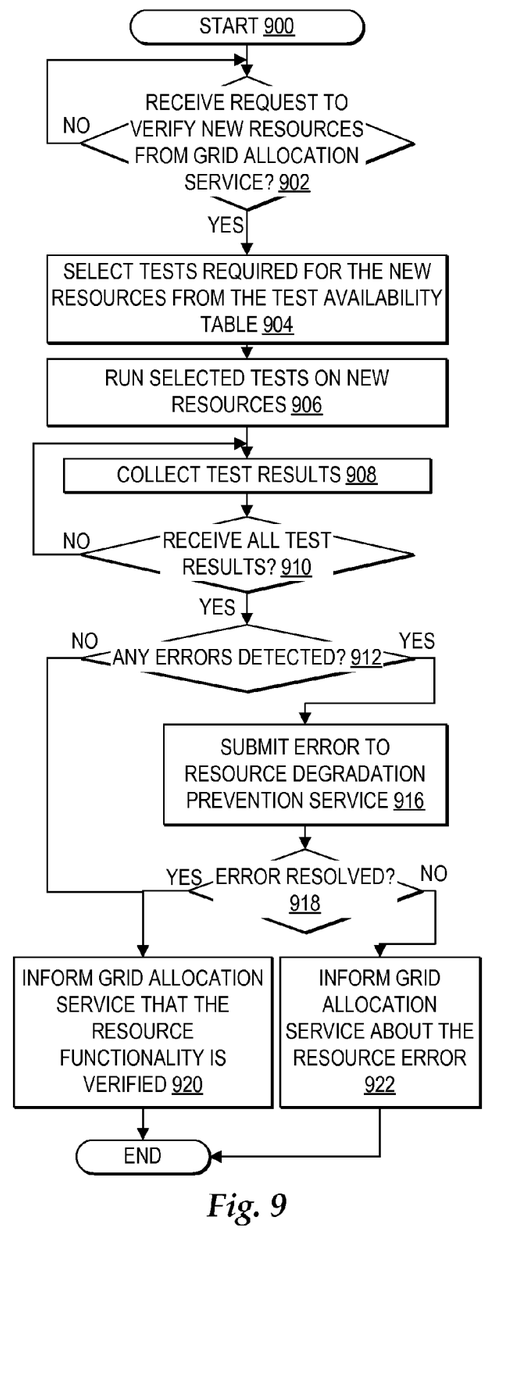
FIG. 9 is a high level logic flowchart of a process and program for controlling resource verification for resources added to an execution environment for a grid job prior to grid job submission to the resources in accordance with the method, system, and program of the present invention.

Referring now to FIG. 9, there is depicted a high level logic flowchart of a process and program for controlling resource verification for resources added to an execution environment for a grid job prior to grid job submission to the resources in accordance with the method, system, and program of the present invention. As illustrated, the process starts at block 900 and thereafter proceeds to block 902. Block 902 depicts a determination whether the grid verification service receives a request to verify new resources from the grid allocation service. If a request to verify new resources is received, then the process passes to block 904. Block 904 depicts selecting tests required for the new resources from a test availability table. Next, block 906 depicts running the selected tests on the new resources, and the process passes to block 908.

Block 908 depicts collecting the test results in a test results table for each new resource. Block 910 depicts a determination whether results are received in response to all run tests. If all results are not yet received, then the process returns to block 908. Once all results are received, then the process passes to block 912.

Block 912 depicts a determination whether any errors are detected in the results. If errors are not detected, then the process passes to block 920. Block 920 depicts informing the grid allocation service that the resource functionality is verified, and the process ends. Otherwise, at block 918, if errors are detected, then the process passes to block 916.

Block 916 depicts submitting the error to the resource degradation prevention service. The resource degradation prevention service attempts to resolve the error. If the resource degradation prevention service cannot resolve the error, then the process passes to block 922. Block 922 depicts informing the grid allocation service about the resource error, and the process ends. Otherwise, at block 918, if the resource degradation prevention service can resolve the error, then the process passes to block 920.

While the invention has been particularly shown and described with reference to a preferred embodiment, it will be understood by those skilled in the art that various changes in form and detail may be made therein without departing from the spirit and scope of the invention.

What is claimed is:

1. A system for verifying a resource within a particular execution environment for a grid job submitted in a grid environment, comprising:
   a grid environment comprising a plurality of computing systems each comprising at least one resource and communicatively connected over a network layer through a grid management system to share each said at least one resource through at least one web service layer atop at least one grid service layer implemented within an open grid services architecture, wherein said at least one grid service layer comprises a grid allocation service and a grid verification service;
   said grid allocation service for managing allocation of a plurality of execution environments each comprising a separate selection of said at least one resource comprising a grouping of at least one hardware platform, at least one network adapter, and at least one type of operating system software;
   said grid allocations service for distributing a grid job to a particular execution environment from among said plurality of execution environments comprising a particular grouping of said at least one resource for handling said grid job;
   said grid allocation service, responsive to allocating a new hardware platform to said particular execution environment from among said plurality of execution environments to replace a defective hardware platform within said particular execution environment, for triggering a grid verification service of said grid management system to determine at least one functionality test for running on said new hardware platform from a plurality of functionality tests specified according to a type of resource, a class of resource, and at least one expected result;
   said grid verification service for running said at least one functionality test on said new hardware platform as controlled by said grid management system by performing at least one of sending a test equation to said particular execution environment and calling a diagnostic tool of a particular operating system software running within said particular execution environment enabled to locally test said new hardware platform;
   said grid verification service, responsive to receiving a result comprising at least one of a result from said test equation and a log file from said diagnostic tool indicating at least one test result, for analyzing by said grid verification service said result for a plurality of specified error conditions specified in a particular expected result;
   said grid verification service, responsive to detecting at least one error from among said plurality of specified error conditions, for attempting by said grid verification service to resolve said at least one error;
   said grid verification service, responsive to resolving said error, for verifying whether said result meets an expected result before enabling routing of said grid job to said new hardware platform, such that a functionality of said new hardware platform is automatically verified before access to said new hardware platform is allowed;
   said grid allocation service, responsive to said error remaining unresolved, for replacing said new hardware platform in said particular execution environment.

2. The system of claim 1 further comprising:
   said grid verification system for selecting said at least one functionality test comprising a plurality of test equations specified for a particular type of processor within said particular execution environment from among a plurality of processor types and said particular expected result.

3. The system of claim 1 further comprising:
   said grid verification system for selecting said at least one functionality test comprising a command reference for a memory diagnostic tool specified for said particular operating system software from among a plurality of type of operating system software to locally run on a memory resource within said particular execution environment and a particular bit patterns for said particular expected result.

4. The system of claim 1 further comprising:
   said grid verification system for selecting said at least one functionality test comprising said test equation of a full pattern read and write test for verifying a functionality of a memory resource within said particular execution environment and said particular expected result.

5. The system of claim 1 further comprising:
   said grid verification system for selecting said at least one functionality test comprising said test equation of a plurality of instructions for verifying a plurality of paths and read and write capabilities of a storage resource within said particular execution environment and said particular expected result.

6. A computer program product, residing on a computer readable medium, for verifying a resource within a particular execution environment for a grid job submitted in a grid environment, comprising:
   enabling a grid environment comprising a plurality of computing systems each comprising at least one resource and communicatively connected over a network layer through a grid management system to share each said at least one resource through at least one web service layer atop at least one grid service layer implemented within an open grid services architecture, wherein said at least one grid service layer comprises a grid allocation service and a grid verification service;
   managing, by said grid allocation service, allocation of a plurality of execution environments each comprising a separate selection of said at least one resource comprising a grouping of at least one hardware platform, at least one network adapter, and at least one type of operating system software;
   distributing, by said grid allocation service, a grid job to a particular execution environment from among said plurality of execution environments comprising a particular grouping of said at least one resource for handling said grid job;
   responsive to said grid allocation service allocating a new hardware platform to said particular execution environment from among said plurality of execution environments to replace a defective hardware platform within said particular execution environment, triggering a grid verification service of said grid management system to determine at least one functionality test for running on said new hardware platform from a plurality of functionality tests specified according to a type of resource, a class of resource, and at least one expected result;

running, by said grid verification service, said at least one functionality test on said new hardware platform as controlled by said grid management system by performing at least one of sending a test equation to said particular execution environment and calling a diagnostic tool of a particular operating system software running within said particular execution environment enabled to locally test said new hardware platform;

responsive to said grid verification service receiving a result comprising at least one of a result from said test equation and a log file from said diagnostic tool indicating at least one test result, analyzing by said grid verification service said result for a plurality of specified error conditions specified in a particular expected result;

responsive to said grid verification service detecting at least one error from among said plurality of specified error conditions, attempting by said grid verification service to resolve said at least one error;

responsive to said grid verification service resolving said error, verifying whether said result meets an expected result before enabling routing of said grid job to said new hardware platform, such that a functionality of said new hardware platform is automatically verified before access to said new hardware platform is allowed;

responsive to said error remaining unresolved, replacing, by said grid allocation service, said new hardware platform in said particular execution environment.

7. The computer program product according to claim 6, further comprising:

selecting, by said grid verification system, said at least one functionality test comprising a plurality of test equations specified for a particular type of processor within said particular execution environment from among a plurality of processor types and said particular expected result.

8. The computer program product according to claim 6, further comprising:

selecting, by said grid verification system, said at least one functionality test comprising a command reference for a memory diagnostic tool specified for said particular operating system software from among a plurality of type of operating system software to locally run on a memory resource within said particular execution environment and a particular bit patterns for said particular expected result.

9. The computer program product according to claim 6, further comprising:

selecting, by said grid verification system, said at least one functionality test comprising said test equation of a full pattern read and write test for verifying a functionality of a memory resource within said particular execution environment and said particular expected result.

10. The computer program product according to claim 6, further comprising:

selecting, by said grid verification system, said at least one functionality test comprising said test equation of a plurality of instructions for verifying a plurality of paths and read and write capabilities of a storage resource within said particular execution environment and said particular expected result.

* * * * *